United States Patent

Iizuka et al.

[11] Patent Number: 5,412,510
[45] Date of Patent: May 2, 1995

[54] IMAGING OPTICAL SYSTEM FOR COMPENSATING CHANGE OF TEMPERATURE

[75] Inventors: Takashi Iizuka; Yasunori Arai; Yoshihiro Yamazaki, all of Tokyo, Japan

[73] Assignee: Asahi Kogaku Kogyo Kabushiki Kaisha, Tokyo, Japan

[21] Appl. No.: 975,128

[22] Filed: Nov. 12, 1992

Related U.S. Application Data

[63] Continuation of Ser. No. 535,482, Jun. 11, 1990, abandoned, which is a continuation-in-part of Ser. No. 419,394, Oct. 10, 1989, abandoned.

[30] Foreign Application Priority Data

May 15, 1989 [JP] Japan .................. 1-120896

[51] Int. Cl.6 .......... G02B 7/02; G02B 26/08
[52] U.S. Cl. .................. 359/820; 359/206; 359/503
[58] Field of Search .......... 350/253, 480, 482; 250/216, 370.15; 359/819, 820, 206–216, 689–690, 784–785, 503–506; 374/14, 15, 120–124, 187–195

[56] References Cited

U.S. PATENT DOCUMENTS

| | | | |
|---|---|---|---|
| 2,537,900 | 1/1951 | Lee et al. | 359/820 |
| 4,190,325 | 2/1980 | Moreno | 359/820 |
| 4,236,790 | 12/1980 | Smith | 350/253 |
| 4,609,945 | 9/1986 | Oguino | 359/820 |
| 4,693,555 | 9/1987 | Arai et al. | 359/820 |
| 4,720,168 | 1/1988 | Kaneko | 350/253 |
| 4,721,373 | 1/1988 | Sugiyama | 350/482 |
| 4,753,524 | 6/1988 | Sugiyama | 350/480 |
| 4,815,059 | 3/1989 | Nakayama et al. | 350/253 |
| 4,855,987 | 8/1989 | Versluis | 250/216 |
| 5,196,957 | 3/1993 | Brueggeman | 359/206 |
| 5,210,650 | 5/1993 | O'Brien et al. | 359/820 |

FOREIGN PATENT DOCUMENTS

| | | | |
|---|---|---|---|
| 58-7109 | 1/1983 | Japan | 350/253 |
| 61-34644 | 8/1986 | Japan | . |
| 63-115120 | 5/1988 | Japan | 350/253 |
| 84607 | 3/1990 | Japan | 359/820 |

OTHER PUBLICATIONS

Translation Of Japanese Patent Document 61-34644.

*Primary Examiner*—Loha Ben
*Assistant Examiner*—Thong Nguyen
*Attorney, Agent, or Firm*—Sandler, Greenblum & Bernstein

[57] ABSTRACT

An imaging optical system for compensating for changes of temperature according to the present invention corrects a focal point for an entire optical system due to temperature change by changing a relative distance between a lens and a light receiving element. To this end, a correcting member, which expands and contracts due to temperature change, is disposed between the lens and the light receiving element. Moreover, the coefficient of thermal expansion is set to such a value so as to be able to substantially correct for the focal point change. According to another aspect of the present invention, the optical system includes a lens system which has at least a positive lens and a negative lens in order to offset the effect of the temperature change.

28 Claims, 14 Drawing Sheets

5,412,510

IMAGING OPTICAL SYSTEM FOR COMPENSATING CHANGE OF TEMPERATURE

CROSS REFERENCE TO RELATED APPLICATION

This application is a continuation of application No. 07/535,482, filed Jun. 11, 1990, now abandoned; which is a continuation-in-part of U.S. Ser. No. 07/419,394 filed Oct. 10, 1989, now abandoned, entitled "IMAGING OPTICAL SYSTEM FOR COMPENSATING CHANGE OF TEMPERATURE" in the name of Takashi IIZUKA, Yasunori ARAI, and Yosihiro YAMAZAKI, the entire disclosure of which is expressly incorporated herein by reference.

BACKGROUND OF THE INVENTION

1. Field of the Invention

This invention relates to an imaging optical system for correcting for a change of a focal point which is caused by a change in refractive index and a change of thermal expansion due to change of temperature. More particularly, the present invention relates to an imaging optical system such as a color scanner, etc. requiring sufficient resolution over a wide range of wavelengths and a high efficiency lens, etc. having a long focal length.

2. Description of the Prior Art

The focal length fluctuation Δf caused by change of temperature of an imaging optical system can be considered as a sum of two factors, i.e., fluctuation or change Δfn caused by the change of refractive index and fluctuation ΔfL caused by thermal expansion.

The focal length fluctuations Δfn and ΔfL with respect to a temperature change Δt from a reference temperature can be expressed as follows:

$$\frac{dfn}{dt} = \frac{1}{1-n} \cdot f \cdot \left(\frac{dn}{dt}\right) \quad (1)$$

$$\frac{dfL}{dt} = f \cdot \left(\frac{1}{L} \cdot \frac{dL}{dt}\right) \quad (2)$$

wherein:
f: focal length of a lens
n: refractive index of a lens
(dn/dt): rate of change of refractive index of a lens $\left(\frac{1}{L} \cdot \frac{dL}{dt}\right)$:

coefficient of thermal expansion

The coefficient of thermal expansion is always positive without regard to the glass material of the lens. In the case of a positive lens, where a relation of focal length f>0 is satisfied, if Δt>0, ΔfL always becomes positive from the equation (2) and if Δt<0, ΔfL always becomes negative.

Since the refractive index n>1, in a case of a positive lens, if Δt>0, Δfn becomes negative when it is formed of an ordinary glass material where the rate of change of the refractive index is positive, and if Δt<0, Δfn becomes positive from the equation (1).

Therefore, in a case of a positive lens formed from ordinary glass material, since ΔfL and Δfn vary inversly with each other, the focal length fluctuation Δf tends to be canceled by the lens itself. The same is true with respect to the negative lens.

In an imaging optical system such as a color scanner, etc. and a high efficiency lens, etc. having a long focal length, which may include a lens formed of a low dispersion glass such as, for example Fk01 (merchandise name, i.e., trademark, of Kabushiki Kaisha Ohara) in order to limit the chromatic aberration.

However, with low dispersion glass, in contrast with general type glass, the rate of change (dn/dt) of the refractive index with respect to change of temperature is a negative value.

When a low dispersion glass is used as a glass material, in a case of a positive lens, if Δt>0, Δfn becomes positive, and if Δt<0, Δfn becomes negative.

Therefore, in a case of a low dispersion glass, ΔfL and Δfn vary in the same manner (i.e., directly with respect to each other). As a result, the focal length fluctuation Δf, which is the sum of ΔfL and Δfn, due to temperature change tends to become large.

Also, in recent times, in order to obtain a light weight and low cost device, plastic lenses are utilized for various lens systems.

However, as the change of refractive index and coefficient of thermal expansion for a plastic lens as a result of a temperature change are large compared with a glass lens, deterioration in imaging efficiency (i.e., focusing) due to a change in focal length is great. Therefore, as result of this problem, a plastic lens is not used in an apparatus requiring no focusing, such as facsimile and image scanner. The focal length fluctuation of the plastic lens due to temperature change is caused by the change in the refractive index and coefficient of thermal expansion, and the influence of the coefficient of thermal expansion is about ¼ ~ ⅓ that of the change of refractive index.

Japan Patent Publication No. Sho 61-34644 discloses a lens system having an object of reducing the focal point change due to the temperature change of the plastic lens. However, this lens system only takes into consideration the influence due to the change in refractive index and is insufficiently efficienct to reduce the effect of temperature change.

SUMMARY OF THE INVENTION

The present invention was developed in view of the problems inherent in a situation where a low dispersion glass lens or a plastic lens is used, as mentioned above. It is therefore the object of the present invention to reduce a focal point change, which is caused by changes in refractive index and coefficient of thermal expansion when a temperature change occurs.

An imaging optical system for compensating for changes in temperature according to the present invention serves to correct a focal point change due to temperature change for the whole optical system by changing the distance between a lens and a light receiving element. To this end, a correcting member, which is expanded and contracted by temperature change, is disposed between the lens and the light receiving element. Moreover, the coefficient of thermal expansion is set to have a value so as to be able to substantially correct for the focal point change.

According to another aspect of the present invention, the optical system includes a lens system which has at least a positive lens and a negative lens in order to offset or compensate for the influence or effect of the temperature change.

DETAILED DESCRIPTION OF THE EMBODIMENTS

The present invention will now be described with reference to the drawings.

The focal length fluctuations (i.e., changes in focal length) $\Delta fn$ and $\Delta fL$ with respect to a temperature change $\Delta t$ from a reference temperature can be expressed by expressions (1), (2).

Referring to a lens in an i-th position in a lens system, the focal length fluctuation $\Delta f_i$ generated in the i-th lens is enlarged or reduced by a lens system which is nearer to the side of the image with respect to the i-th lens. Given that the lateral magnification from the i-th lens to the image side is represented by $m_i$ and the lateral magnification from the i+1-th lens to the image side is represented by $m_{i+1}$, the focal point change $\Delta\epsilon_i$ which finally appears on the image side can be approximated in accordance with the following relation (3).

$$\frac{d\epsilon_i}{dt} = (m_{i+1} - m_i)^2 \cdot \left(\frac{dfn_i}{dt} + \frac{dfL_i}{dt}\right) \quad (3)$$

Accordingly, when the whole system of the imaging optical system comprising N pieces of lens is taken into consideration, the focal point change due to temperature change becomes the sum of the focal length fluctuation of the various lenses, and can be expressed as follows.

$$\frac{d\epsilon}{dt} = \sum_{i=1}^{N} \frac{d\epsilon_i}{dt} \quad (4)$$

FIRST EMBODIMENT

Figure 1:
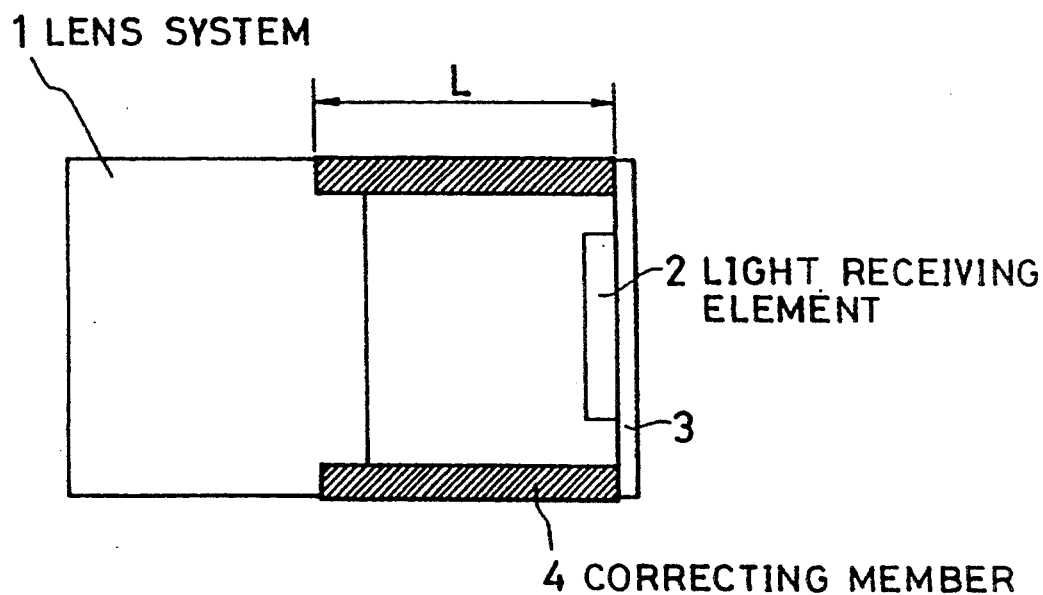
FIG. 1 is an explanatory view showing a first embodiment of an imaging optical system for compensating for change of temperature according to the present invention.

FIG. 1 shows a first embodiment of an imaging optical system for compensating for a change of temperature according to the present invention. In this embodiment, an optical system having a positive focal point change rate $\Delta\epsilon$ with respect to temperature change of one degree is illustrated, for example, an imaging optical system having a positive lens formed of a low dispersion glass in which (dn/dt) becomes negative is shown.

In the figure, the numeral 1 denotes a group of lenses which constitute the imaging optical system. The lens group 1 is mounted on a substrate 3 supporting a light receiving element 2 through two correcting members 4. The correcting members 4 are adapted to change the relative distance between the light receiving element 2 and the lens group 1 by means of linear expansion due to a change of temperature, in which thermal expansion (dL/dt), for the entire correcting member 4, is set within a range as set forth hereunder:

$$0.6 \cdot \frac{d\epsilon}{dt} < \frac{dL}{dt} < 1.4 \frac{d\epsilon}{dt}$$

By virtue of the foregoing arrangement, the lens group 1 can be moved with respect to the light receiving element 2 in accordance with the change of temperature.

The lens group 1, as shown in table 1, comprises six lenses L1~L6. The first, second, fifth and sixth lenses are positive, while the third and fourth lenses are negative. Also, of the four positive lenses, the second and fifth lenses L2 and L5 are formed of a low dispersion glass (Fk01).

In the table 1, the character r represents the radius of curvature of each surface, d represents a distance between two surfaces along the optical axis or between two air interfaces, (i.e., lens thickness or distance between lenses), n represents a refractive index with respect to the d line (wavelength of 587.56 nm) at a reference temperature 20° C., $\nu d$ represents an Abbe number, $m_i$ represents a lateral magnification from each lens to the light receiving element side at the reference temperature of 20° C., and $m_{i+1}$ represents a lateral magnification from the next lens to the light receiving element side.

The focal length f0 on the e-line (546 nm) of the whole imaging optical system is 70 mm, and the working magnification m is −0.224.

TABLE 1

| face No | r | d | nd | ν d | f | $m_i$ | $(m_{i+1} - m_i)^2$ |
|---|---|---|---|---|---|---|---|
| 1 | 31.662 | 2.94 | 1.64000 | 60.1 | 86.31 | −0.224 | 0.843 |
| 2 | 70.545 | 0.10 | | | | | |
| 3 | 15.616 | 4.06 | 1.49700 | 81.6 | 3.57 | 0.694 | 3.190 |
| 4 | 50.376 | 1.00 | | | | | |
| 5 | 39.269 | 2.00 | 1.61340 | 43.8 | −31.52 | 2.480 | 3.779 |
| 6 | 12.788 | 17.28 | | | | | |
| 7 | −10.615 | 2.00 | 1.61340 | 43.8 | −32.86 | 0.536 | 2.599 |
| 8 | −23.780 | 0.50 | | | | | |
| 9 | −25.099 | 3.45 | 1.49700 | 81.6 | 55.54 | −1.076 | 1.208 |
| 10 | −13.786 | 0.10 | | | | | |
| 11 | −109.820 | 2.98 | 1.64000 | 60.1 | 62.62 | 0.023 | 0.955 |
| 12 | −29.771 | | | | | | |

The temperature characteristics of lens group 1 are shown in table 2. The rates of change of the refractive index due to temperature change are negative for L2 and L5 and positive for the remaining lenses, while the coefficients of thermal expansion are positive for all the lenses. Therefore, as the focal point change coefficient Δεn/dt (unit: μm) due to the change of refractive index with respect to a temperature change of 1° C., and the focal point change coefficient ΔεL/dt due to thermal expansion become different, these changes cancel each other in the first, third, fourth and sixth lenses, and the resulting focal point change ΔεL/dt corresponding to a unit temperature change takes a comparatively small value.

Also, since Δεn/dt and ΔεL/dt vary directly with respect to each other in the second and fifth lenses, the focal point change Δε/dt become fairly large, compared with the other lenses. In this example, 87% of the focal point change which occurs for the whole optical system occurs in the second and fifth lenses.

TABLE 2

| lens No | dn/dt | (1/L) (dL/dt) | Δεn/dt | ΔεL/dt | Δε/dt |
|---|---|---|---|---|---|
| 1 | $3.7 \times 10^{-6}$ | $5.8 \times 10^{-6}$ | −0.418 | 0.422 | 0.004 |
| 2 | $-5.5 \times 10^{-6}$ | $12.7 \times 10^{-6}$ | 1.531 | 1.765 | 3.296 |
| 3 | $5.5 \times 10^{-6}$ | $5.3 \times 10^{-6}$ | 1.050 | −0.631 | 0.428 |
| 4 | $5.5 \times 10^{-6}$ | $5.3 \times 10^{-6}$ | 0.759 | −0.453 | 0.306 |
| 5 | $-5.5 \times 10^{-6}$ | $12.7 \times 10^{-6}$ | 0.739 | 0.852 | 1.591 |
| 6 | $3.7 \times 10^{-6}$ | $5.8 \times 10^{-6}$ | −0.342 | 0.346 | 0.004 |
| | | | | total | 5.629 |

It is preferable that the correcting member 4 has a coefficient of thermal expansion generally equal to that of acrylic resin and, assuming that a correcting material 4, having generally the same length as a distance f(1−m) from a main point at the rear side of the optical system, to the light receiving element 2 is used, a focal point change $\Sigma(K_i \cdot T_i)$ due to temperature change of the optical system is within the range of the following relation.

$$f(1-m) \cdot 10^{-5} < \left| \sum_{i=1}^{N} (K_i \cdot T_i) \right| < f(1-m) \cdot 10^{-4}$$

In this inequality, when the focal point change exceeds the upper limit, it becomes necessary to have a correcting member having a coefficient of thermal expansion which is larger by one digit than that of acrylic resin. However, this makes it impossible to perform a delicate adjustment. On the contrary, when the focal point change falls below the lower limit, no correction is required.

The correcting member 4 is formed of acrylic resin, which is a copolymer including methacrylate as a principal component and has a length L in this example. The coefficient of thermal expansion per unit length of the acrylic resin can be expressed as follows:

$$\frac{1}{L} \cdot \frac{dL}{dt} = 6.2 \times 10^{-5} /°C.$$

By setting L to an appropriate value, the imaging accuracy of the optical system can maintained at a high level, generally cancelling the focal point change Δε.

Table 3 shows a focal length fluctuation Δf(unit: μm) with respect to the change of temperature from the above-mentioned reference temperature of 20° C. of the imaging optical system, a focal point change ΔP obtained by chasing (i.e., following) a paraxial ray in accordance with this focal point change, a value of an approximation Δf(1−m)², Δε obtained from the relation (4), and a thermal expansion ΔL of the correcting member when L=80 mm.

As will be understood from this table 3, almost all of the focal point change due to the temperature change can be corrected by making Δε≈ΔL.

TABLE 3

| t | Δf | ΔP | Δf (1 − m)² | Δε | ΔL |
|---|---|---|---|---|---|
| 0 | −67 | −97 | −100 | −113 | −99 |
| 10 | −34 | −50 | −51 | −56 | −50 |
| 20 | 0 | 0 | 0 | 0 | 0 |
| 30 | 34 | 48 | 51 | 56 | 50 |
| 40 | 69 | 97 | 103 | 113 | 99 |
| 50 | 104 | 145 | 156 | 169 | 149 |

Figure 2:
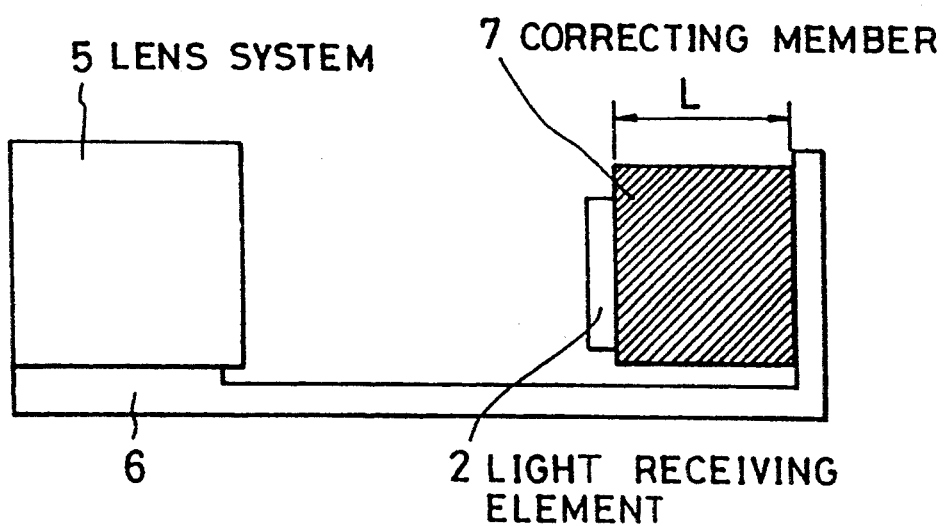
FIG. 2 is an explanatory view showing various examples of the first embodiment of the present invention.

FIG. 2 shows various examples of an imaging optical system according to the first embodiment of the present invention. In this second embodiment, there is shown, as one example, an imaging optical system wherein a negative lens uses a low dispersion glass in which (dn/dt) becomes negative.

In this example, a lens group 5 is fixed to a substrate 6 having a small thermal expansion and the light receiving element 2 is mounted on the substrate 6 through a correcting member 7. By virtue of the foregoing arrangement, the light receiving element 2 is moved with respect to the lens and the focal point change can be corrected by the same principle as mentioned above.

SECOND EMBODIMENT

Next, a second embodiment of the present invention will be described. In this embodiment, the focal point change Δε, which is defined by relation (4), of said lens system due to change of temperature is set within a 1/10 range of depth of focus.

According to this embodiment, the optical system includes a positive plastic lens (focal length $f_i$, refractive index $n_i$) in the i-th position, and a negative plastic lens (focal length $f_j$, refractive index $n_j$) in the j-th position respectively from the object side in Order to offset the influence of the temperature change.

Assuming that the lateral magnification from the i-th lens to the image surface is $m_i$, the lateral magnification from the i+1-th lens to the image surface is $m_{i+1}$, the lateral magnification from the j-th lens to the image surface is $m_j$, the lateral magnification from the j+1-th lens to the image surface is $m_{j+1}$, the F number of the whole system is F, the lateral magnification of the whole system is m, and the picture element size of a light receiving element is p, the following relation is satisfied;

$$\left| \sum_{i=1}^{N} (K_i \cdot T_i) + \sum_{j=1}^{N} (K_j \cdot T_j) \right| < \frac{p \cdot F \cdot (1-m)}{10} \quad (5)$$

wherein
$k_i = f_i \cdot (m_{1+i} - m_i)^2$
$K_j = f_j \cdot (m_{1+j} - m_j)^2$ $$T_i = \left( \frac{1}{L} \cdot \frac{dL}{dt} \right)_i + \cdot \frac{1}{1-n_i} \cdot \left( \frac{dn}{dt} \right)_i$$

$$T_j = \left( \frac{1}{L} \cdot \frac{dL}{dt} \right)_j + \cdot \frac{1}{1-n_j} \cdot \left( \frac{dn}{dt} \right)_j$$

$T_i$ and $T_j$ represent focal length fluctuation due to a change of refractive index and thermal expansion per unit temperature change, i.e., static factors originating in the temperature characteristics of the lens itself.

Also, $K_i$ and $K_j$ represent dynamic factors originating in positions of the i-th lens and the j-th lens in a lens system.

By taking these two factors into consideration, the focal point change of the whole lens system due to the focal length fluctuation of the positive and negative plastic lens can be regulated.

On the other hand, the depth of focus on the side of an image field can be expressed by $p \cdot F \cdot (1-m)$ wherein p is the size of a picture element of the light receiving element. In this situation, $F \cdot (1-m)$ corresponds to an effective F number.

Assuming that the range of the working temperature is ±10° C. with respect to a design basis temperature, the focal point change of the whole lens system due to temperature change can be limited so as not to cause a problem with respect to image efficiency by satisfying the above relation (5).

Additionally, if the denominator of the relation (5) is set to 20, the effect of the change of temperature can be reduced more effectively.

The example, which will be described hereunder, is of a lens system having three lens groups comprising three lenses in which a first lens is a positive plastic lens, a second lens is a double concave negative plastic lens, and a third lens is a double convex positive lens. The lenses are arranged in this order from the object side, and the following conditions (6) through (9) are satisfied.

$$0.30 < |f_2|/f < 0.40 \quad (6)$$

$$0.40 < f_3/f < 0.50 \quad (7)$$

$$0.28 < |r_3|/f < 0.40 \quad (8)$$

$$n_5 > 1.75 \quad (9)$$

wherein
f: focal length of the whole system
$f_i$: focal length of the i-th lens
$r_3$: radius of curvature of the third surface
$n_5$: refractive index of the third lens Relations (6)~(9) are conditions for keeping the powers of the first and second lenses, which are plastic lenses within appropriate ranges and reducing the influence due to the change of temperature while maintaining a favorable efficiency.

Expression (6) is the condition for obtaining a good balance with the first lens by keeping the focal length of the second lens having a negative power in an appropriate range and maintaining a favorable efficiency. When the value $|f_2|/f$ become larger than 0.40, the negative power is in shortened, and the correction of chromatic aberration and curvature of field becomes difficult. When the ratio falls below the lower limit, the focal point change due to the change of temperature becomes large.

Expression (7) is the condition for maintaining aberration correcting ability by keeping the focal length of the third lens, formed of glass, in an appropriate range. When the focal length of the third lens (i.e., the ratio) exceeds the upper limit, a power distribution to the first lens becomes excessive and the correction of the curvature of field becomes difficult. When the ratio falls below the lower limit, the focal point change due to the change of temperature becomes large.

Expression (8) is the condition for making the first surface of the second lens acts as a strong divergent surface, as the power of the first lens is comparatively large. When the ratio exceeds the upper limit, a coma-flare is generated on the second surface of the second lens, and a favorable efficiency is difficult to obtain.

Expression (9) is the condition for keeping the Pettsvar sum small by using a glass material having a high refractive index for the third lens. When the ratio falls below the lower limit, the correction of the curvature of field and astigmatism becomes difficult.

Concrete numerical values for each embodiment are as shown in table 4 through table 11.

In the tables, FNO represents an F number, f represents a focal length on the e-line (wavelength of 546 nm), r represents the radius of curvature of a surface, d represents a lens thickness or an air distance, n represents a refractive index of a lens on the d-line, and $\nu$ represents a dispersion (Abbe number) in the vicinity of the d-line.

EXAMPLE 1

Figure 3:
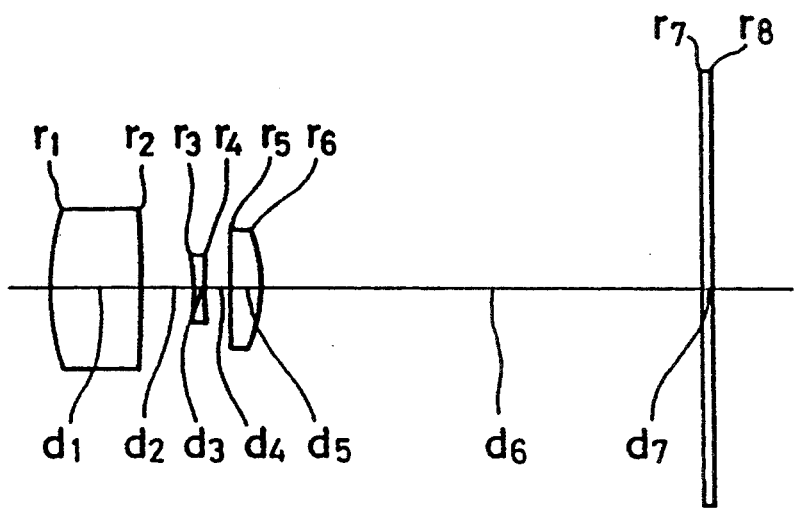
FIG. 3 is a sectional view of a lens system showing example 1 of the second embodiment according to the present invention.
Figure 4:
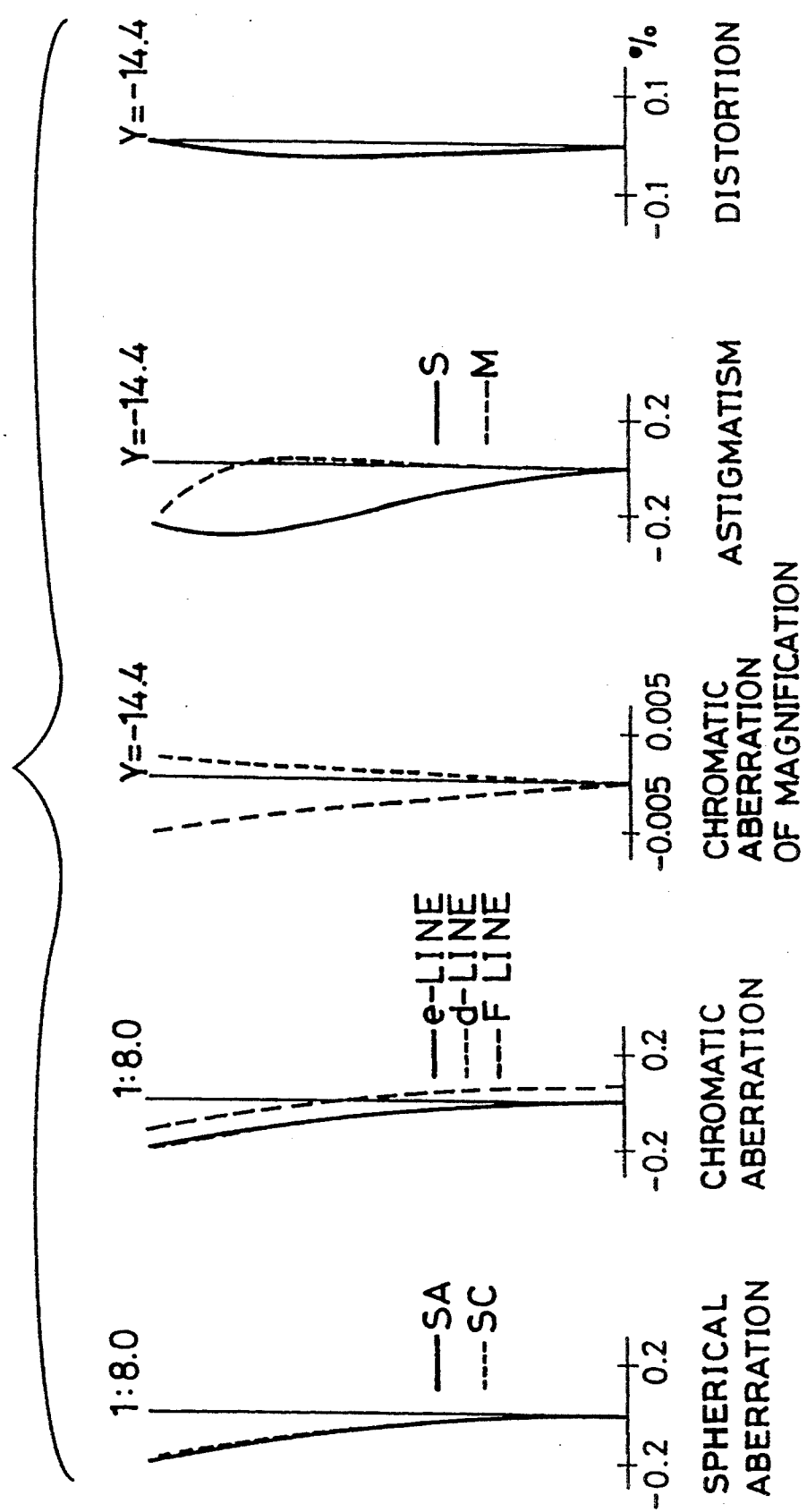
FIG. 4 are aberrations diagrams for the lens system of FIG. 3.

FIG. 3 shows example 1 of the second embodiment according to the present invention. Concrete numerical values are shown in table 4 and aberrations thereof are shown in FIG. 4. The seventh and eighth surfaces refer to a cover glass.

TABLE 4

| face No | FNO. = 1:8.0 | f = 29.61 | m = −0.112 | |
|---|---|---|---|---|
| | r | d | n | $\nu$ |
| 1 | 18.205 | 6.00 | 1.49186 | 57.4 |

TABLE 4-continued

| face No | FNO. = 1:8.0 f = 29.61 m = −0.112 | | | |
|---|---|---|---|---|
| | r | d | n | ν |
| 2 | −64.814 | 3.30 | | |
| 3 | −9.494 | 0.80 | 1.58547 | 29.9 |
| 4 | 20.936 | 1.53 | | |
| 5 | 121.981 | 2.07 | 1.77250 | 49.6 |
| 6 | −10.483 | 28.88 | | |
| 7 | ∞ | 0.70 | 1.51633 | 64.1 |
| 8 | ∞ | | | |

EXAMPLE 2

Figure 5:
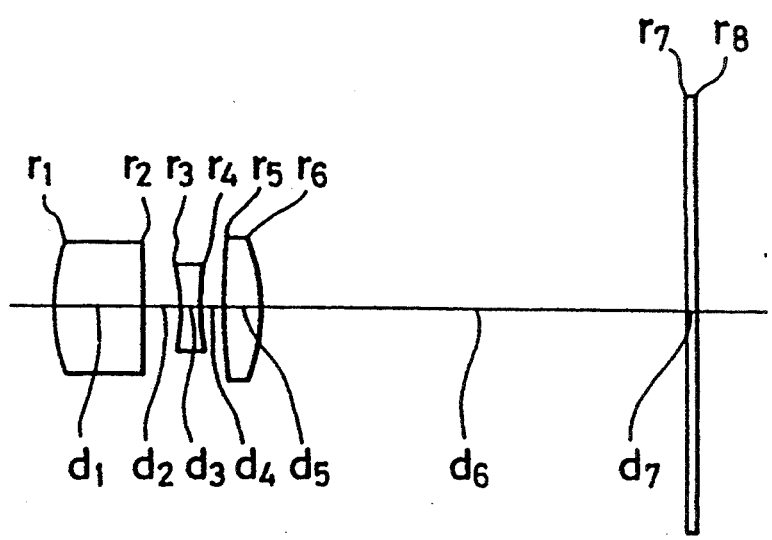
FIG. 5 is a sectional view of a lens system showing example 2 of the second embodiment according to the present invention.
Figure 6:
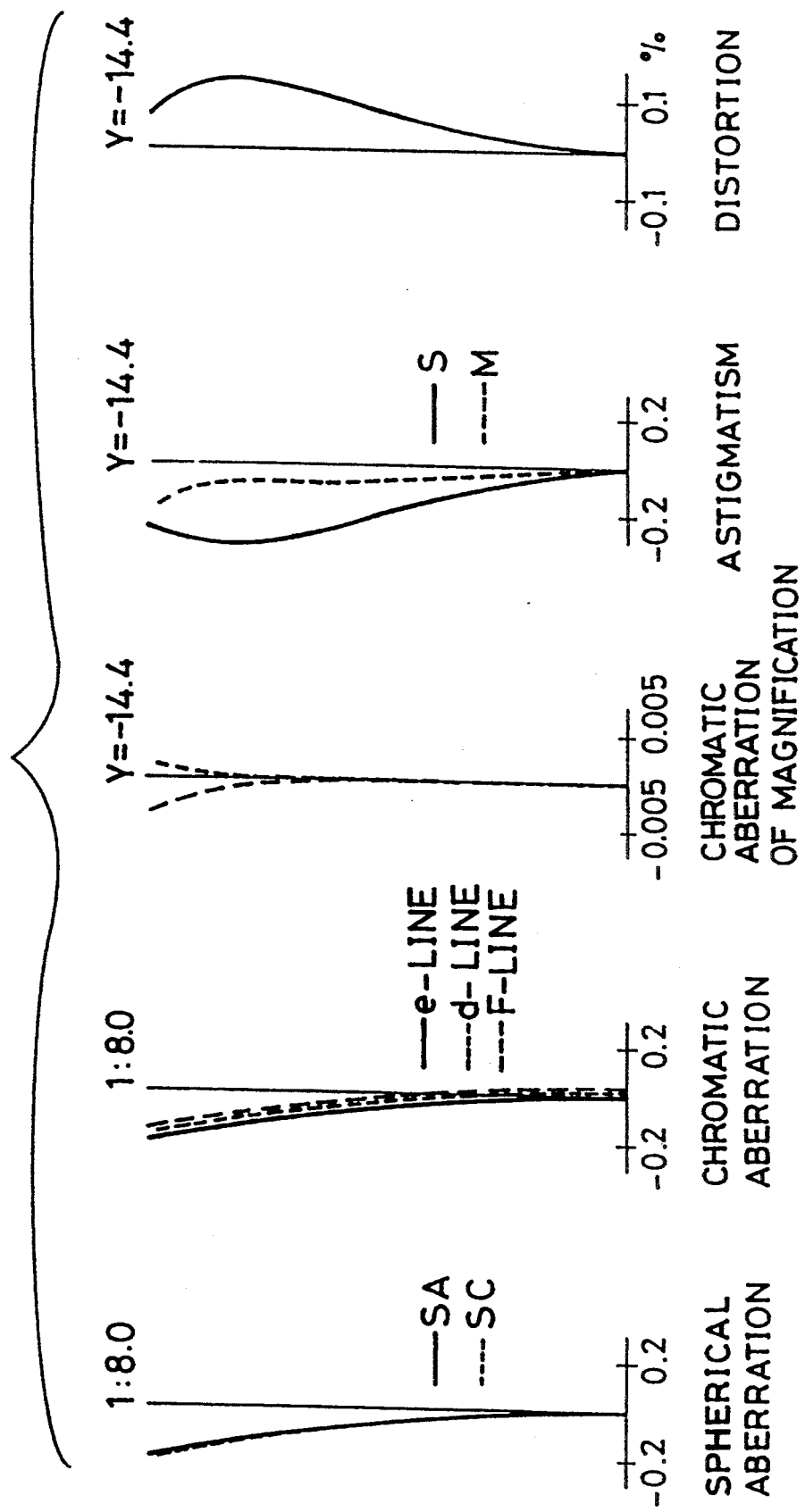
FIG. 6 are aberration diagrams of the lens system of FIG. 5.

FIGS. 5 and 6 show example 2 of the second embodiment of the present invention. Numerical values are shown in table 5. Example 1 uses only spherical lenses. In the second and subsequent examples, the first surface of the first lens is formed as an aspherical surface in order to reduce the aberration.

In the table, a mark * for an aspherical surface is printed in the column of the radius of curvature in order to distinguish it from a spherical surface, and the numerical value represents the radius of curvature at the vertex of the aspherical surface.

The aspherical surface is expressed as follows:

$$X = \frac{CY^2}{1 + \sqrt{1 - (1 + K)C^2Y^2}} + A_4Y^4 + A_6Y^6 + A_8Y^8$$

wherein X is a distance from a tangential plane of the vertex of an aspherical surface on an aspherical surface having a height Y from the optical axis, C is the curvature (1/r) of the vertex of the aspherical surface, K is a coefficient of a circular cone, and $A_4$, $A_6$, and $A_8$ are the fourth, sixth, and eighth aspherical surface coefficients.

TABLE 5

| face No | FNO. = 1:8.0 f = 30.68 m = −0.112 | | | |
|---|---|---|---|---|
| | r | d | n | ν |
| 1 | *12.121 | 6.00 | 1.49186 | 57.4 |
| 2 | 500.000 | 2.37 | | |
| 3 | −10.682 | 1.40 | 1.58547 | 29.9 |
| 4 | 17.011 | 1.51 | | |
| 5 | 52.130 | 2.36 | 1.80400 | 46.6 |
| 6 | −13.719 | 27.59 | | |
| 7 | ∞ | 0.70 | 1.51633 | 64.1 |
| 8 | ∞ | | | |

K = 0.42433700
$A_4$ = 0.00000000
$A_6$ = 0.00000000
$A_8$ = 0.00000000

EXAMPLE 3

Figure 7:
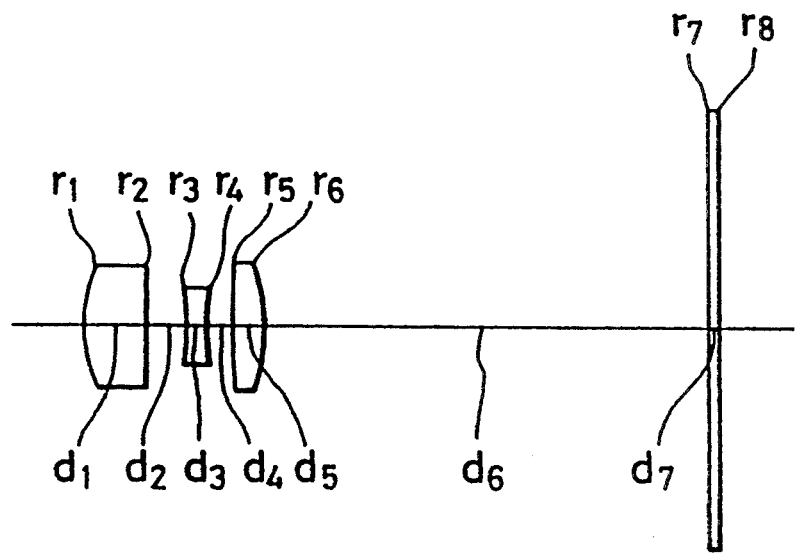
FIG. 7 is a sectional view of a lens system showing example 3 of the second embodiment according to the present invention.
Figure 8:
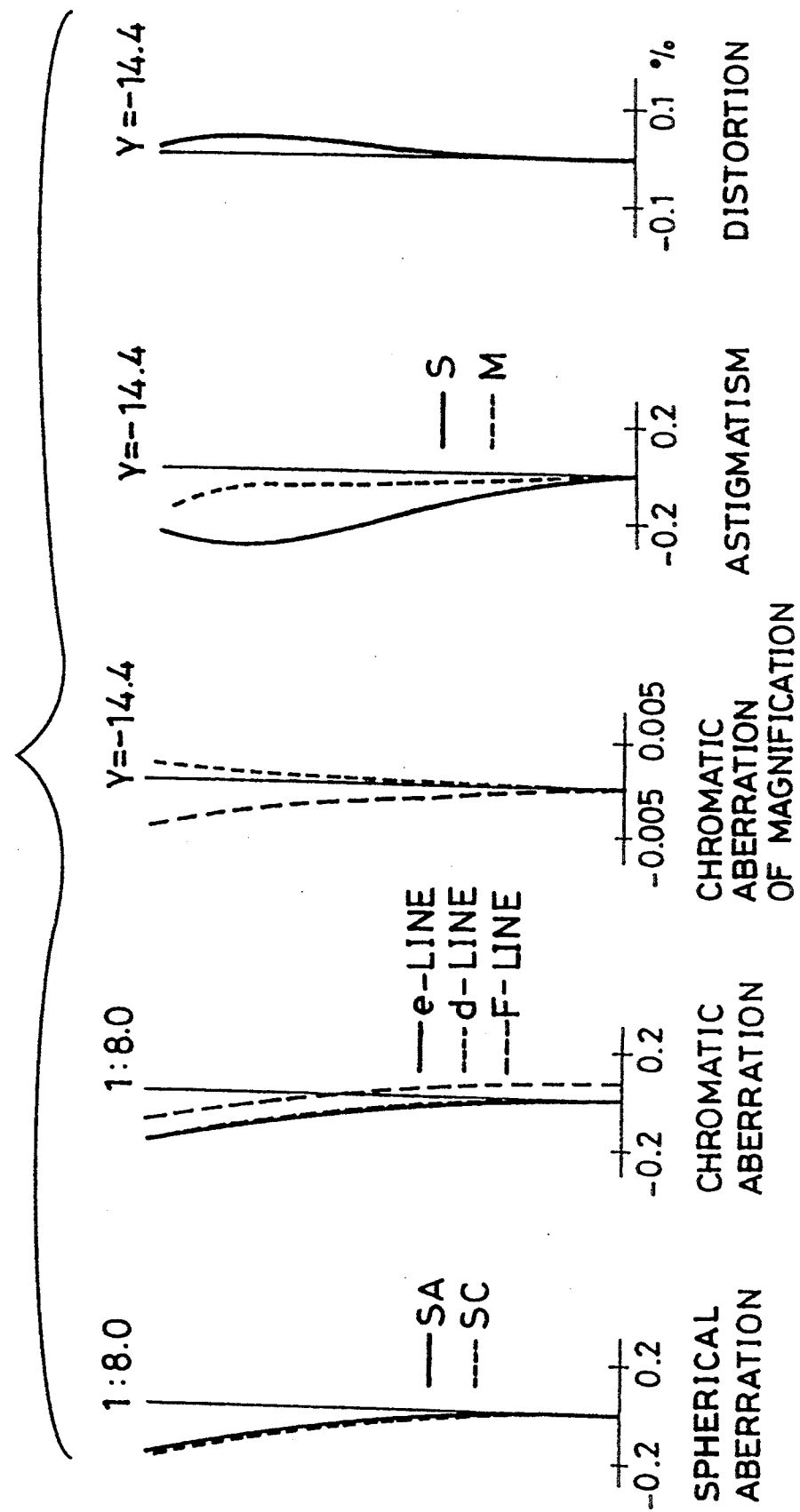
FIG. 8 are aberration diagrams of the lens system of FIG. 7.

FIGS. 7 and 8 show example 3 of the second embodiment according to the present invention, and numerical values thereof are shown in table 6.

TABLE 6

| face No | FNO. = 1:8.0 f = 30.72 m = −0.112 | | | |
|---|---|---|---|---|
| | r | d | n | ν |
| 1 | *11.449 | 4.00 | 1.49186 | 57.4 |
| 2 | −3399.341 | 2.54 | | |
| 3 | −10.292 | 1.40 | 1.58547 | 29.9 |
| 4 | 16.666 | 1.56 | | |
| 5 | 63.536 | 2.19 | 1.80400 | 46.6 |
| 6 | −13.422 | 28.86 | | |
| 7 | ∞ | 0.70 | 1.51633 | 64.1 |

TABLE 6-continued

| face No | FNO. = 1:8.0 f = 30.72 m = −0.112 | | | |
|---|---|---|---|---|
| | r | d | n | ν |
| 8 | ∞ | | | |

K = 0.91424306
$A_4$ = 0.33111623 × $10^{-4}$
$A_6$ = 0.00000000
$A_8$ = 0.00000000

EXAMPLE 4

Figure 9:
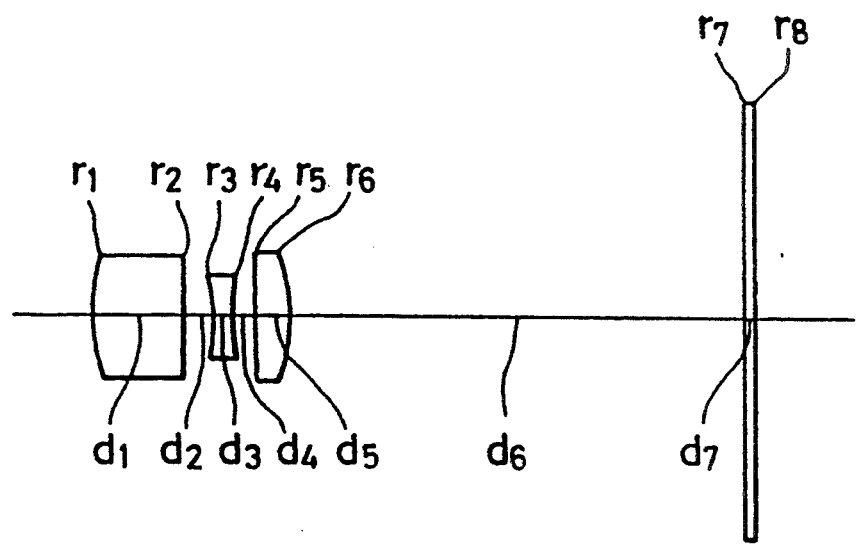
FIG. 9, is a sectional view of a lens system showing example 4 of the second embodiment according to the present invention.
Figure 10:
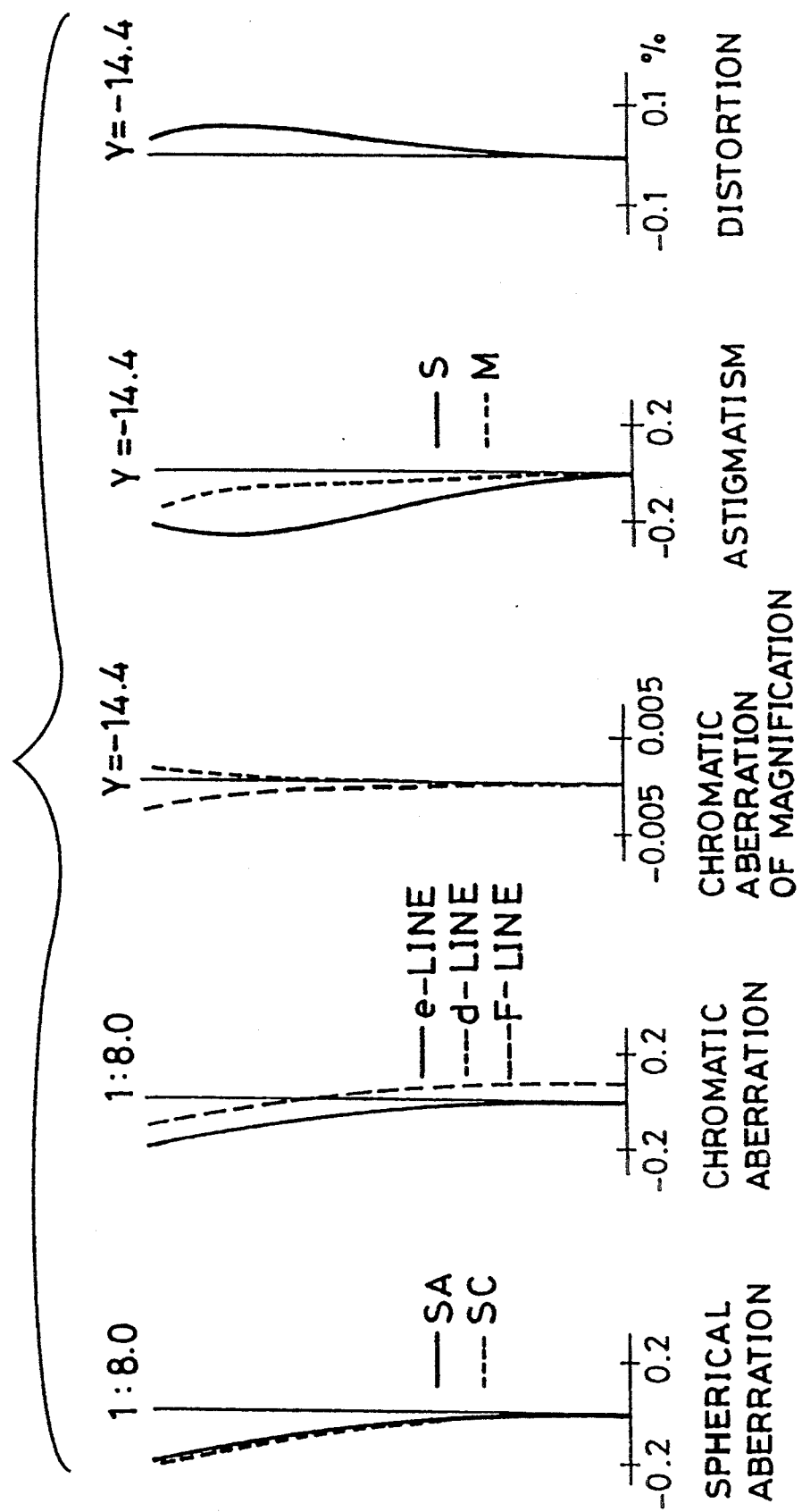
FIG. 10 are aberration diagrams of the lens system of FIG. 9.

FIGS. 9 and 10 show example 4 of the second embodiment according to the present invention, and numerical values thereof are shown in table 7.

TABLE 7

| face No | FNO = 1:8.0 f = 31.84 m = −0.112 | | | |
|---|---|---|---|---|
| | r | d | n | ν |
| 1 | *11.961 | 6.00 | 1.49186 | 57.4 |
| 2 | 311.055 | 1.82 | | |
| 3 | −9.683 | 1.40 | 1.58547 | 29.9 |
| 4 | 17.862 | 1.34 | | |
| 5 | 58.952 | 2.24 | 1.80400 | 46.6 |
| 6 | −12.960 | 29.69 | | |
| 7 | ∞ | 0.70 | 1.51633 | 64.1 |
| 8 | ∞ | | | |

K = 0.11981200
$A_4$ = 0.30824000 × $10^{-4}$
$A_6$ = 0.10956800 × $10^{-5}$
$A_8$ = 0.00000000

EXAMPLE 5

Figure 11:
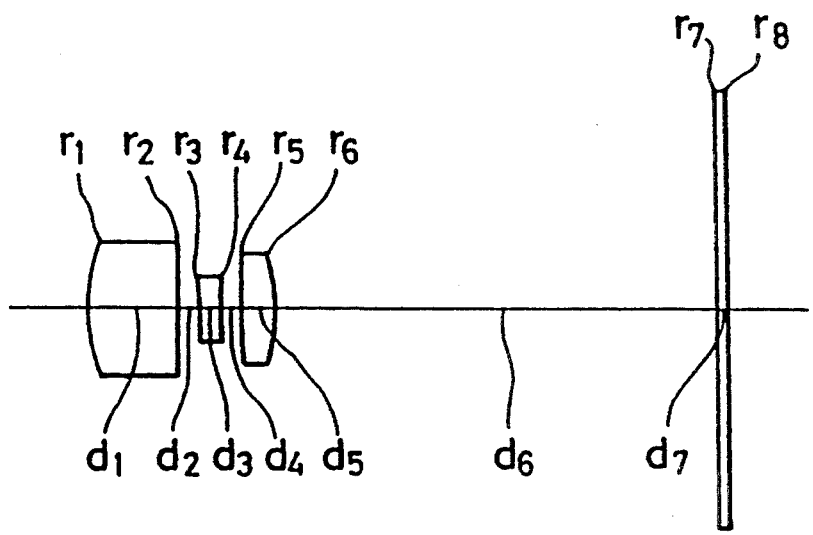
FIG. 11 is a sectional view of a lens system showing example 5 of the second embodiment according to the present invention.
Figure 12:
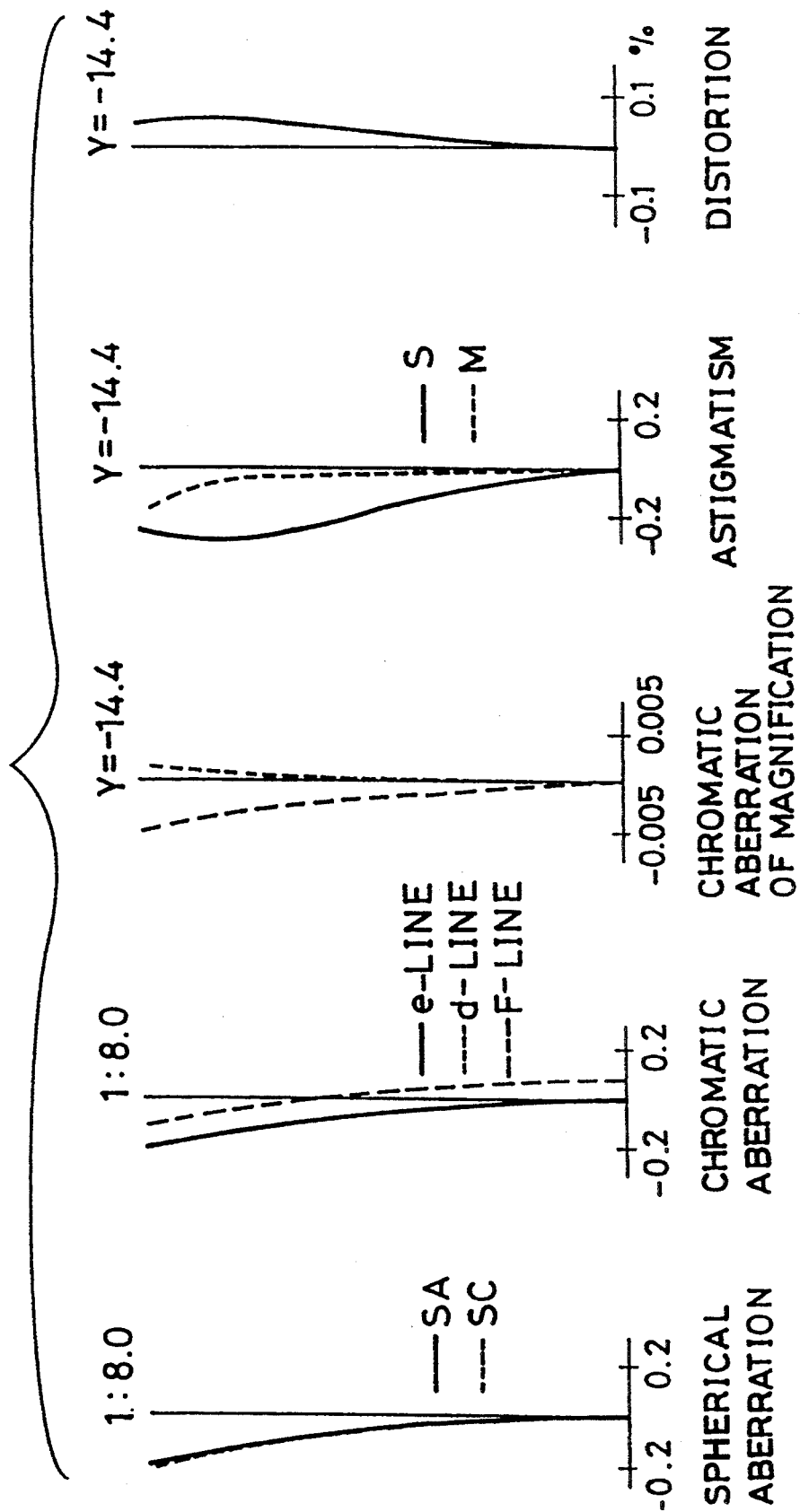
FIG. 12 are aberration diagrams of the lens system of FIG. 11.

FIGS. 11 and 12 show example 5 of the second embodiment according to the present invention, and numerical values thereof are shown in table 8.

TABLE 8

| face No | FNO. = 1:8.0 f = 30.63 m = −0.112 | | | |
|---|---|---|---|---|
| | r | d | n | ν |
| 1 | *11.681 | 6.00 | 1.49186 | 57.4 |
| 2 | −4283.812 | 1.44 | | |
| 3 | −9.718 | 1.40 | 1.58547 | 29.9 |
| 4 | 17.378 | 1.30 | | |
| 5 | 62.212 | 2.13 | 1.80400 | 46.6 |
| 6 | −12.834 | 28.59 | | |
| 7 | ∞ | 0.70 | 1.51633 | 64.1 |
| 8 | ∞ | | | |

K = 0.39133656 × $10^{-1}$
$A_4$ = 0.50243544 × $10^{-4}$
$A_6$ = 0.10798819 × $10^{-5}$
$A_8$ = 0.13983309 × $10^{-7}$

EXAMPLE 6

Figure 13:
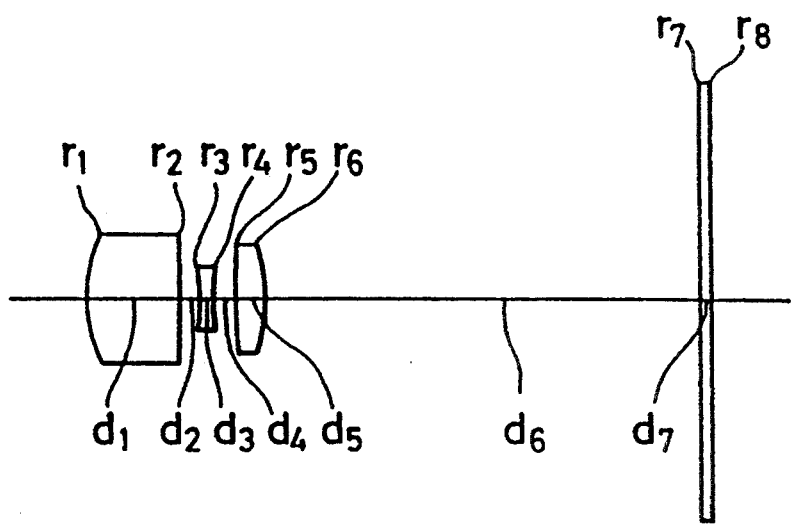
FIG. 13 is a sectional view of a lens system showing example 6 of the second embodiment according to the present invention.
Figure 14:
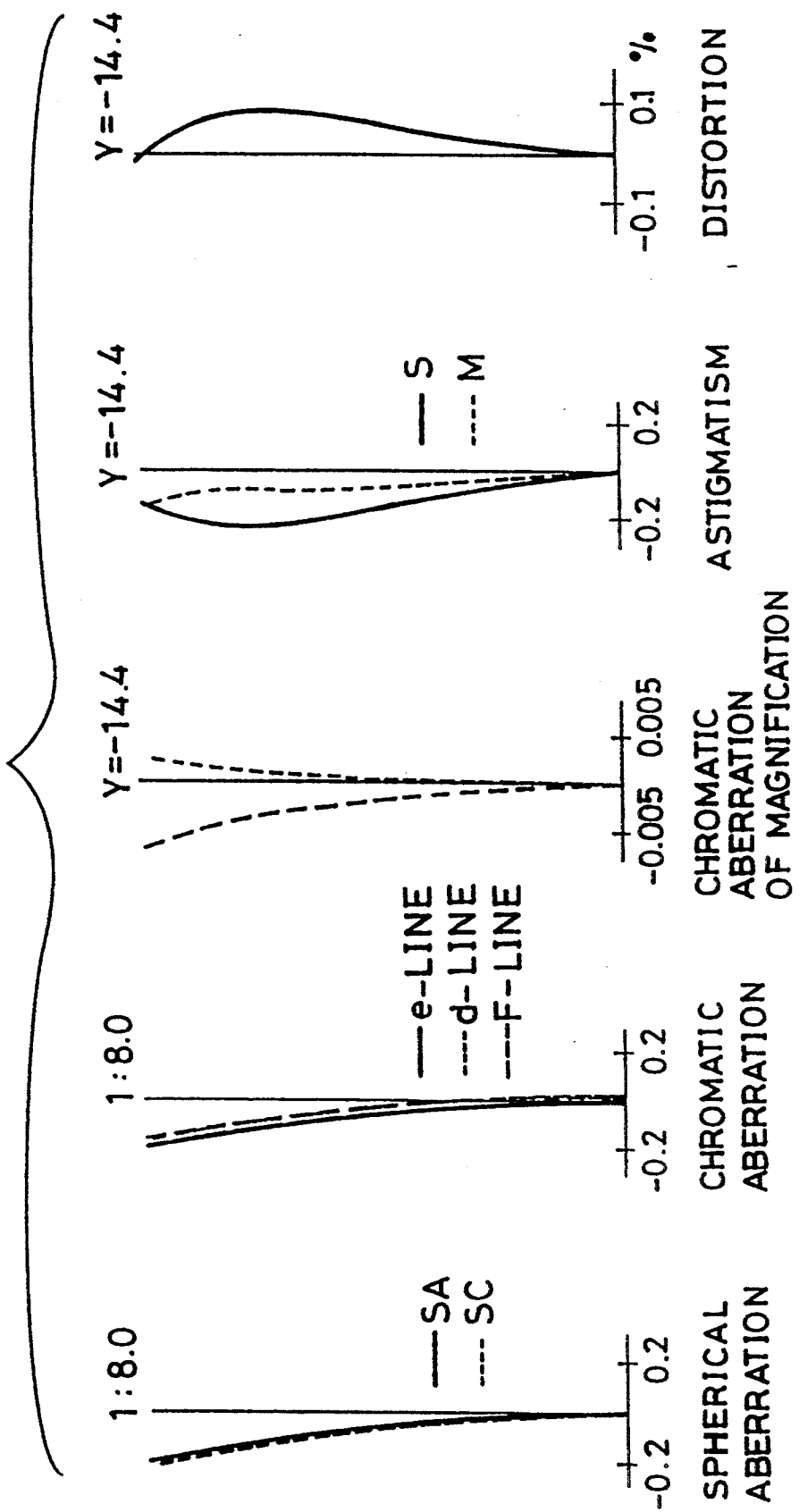
FIG. 14 are aberration diagrams of the lens system of FIG. 13.

FIGS. 13 and 14 show example 6 of the second embodiment according to the present invention, and numerical values thereof are shown in table 9.

TABLE 9

| face No | FNO. = 1:8.0 f = 31.18 m = −0.112 | | | |
|---|---|---|---|---|
| | r | d | n | ν |
| 1 | *10.730 | 6.00 | 1.49186 | 57.4 |
| 2 | 111.294 | 1.36 | | |
| 3 | −10.343 | 0.80 | 1.58547 | 29.9 |
| 4 | 15.417 | 1.45 | | |
| 5 | 55.611 | 1.82 | 1.83481 | 42.7 |
| 6 | −13.803 | 28.56 | | |
| 7 | ∞ | 0.70 | 1.51633 | 64.1 |
| 8 | ∞ | | | |

K = 0.31898464 × $10^{-1}$
$A_4$ = 0.37922729 × $10^{-4}$
$A_6$ = 0.49101462 × $10^{-6}$
$A_8$ = 0.24853732 × $10^{-7}$

EXAMPLE 7

Figure 15:
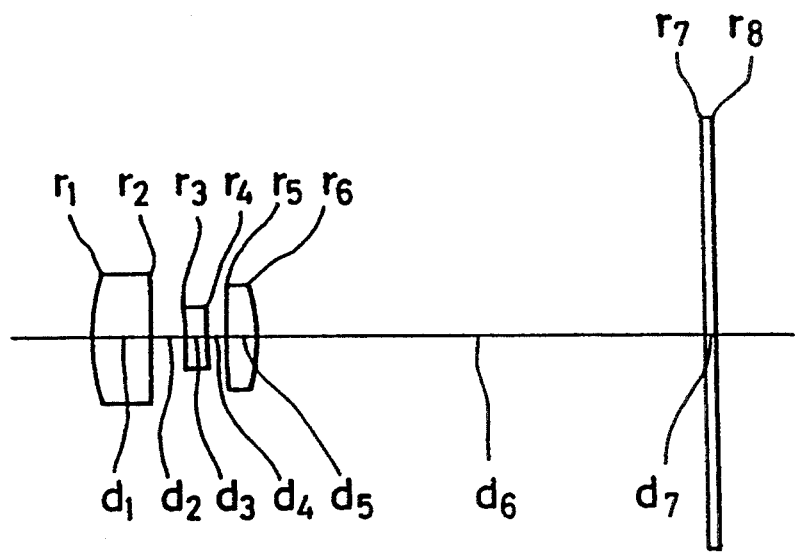
FIG. 15 is a sectional view of a lens system showing example 7 of the second embodiment according to the present invention.
Figure 16:
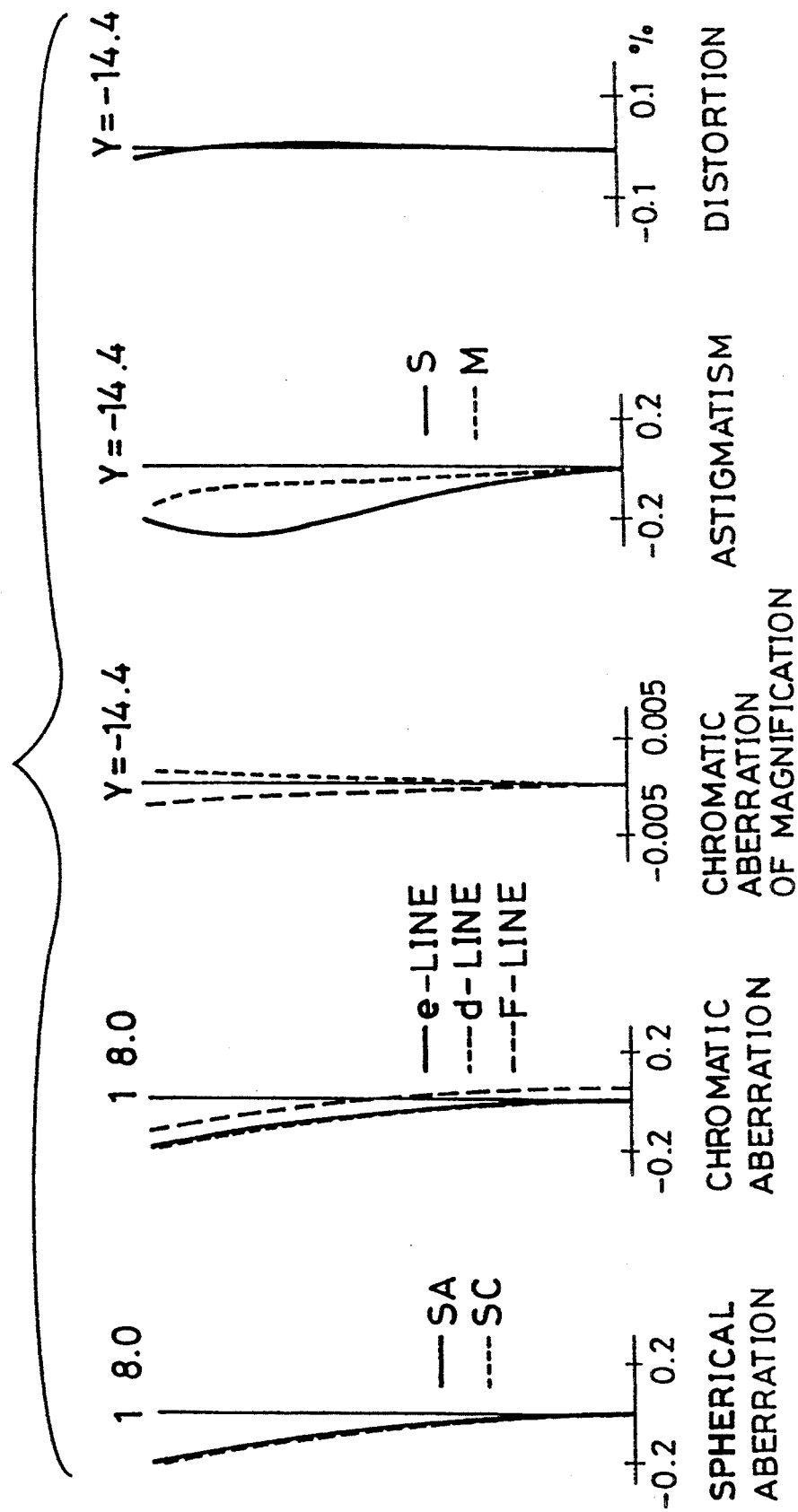
FIG. 16 are aberration diagrams of the lens system of FIG. 15.

FIGS. 15 and 16 show example 7 of the second embodiment according to the present invention, and numerical values thereof are shown in table 10.

Examples 7 and 8 use APO (amorphous polyolefine: merchandise name) for the first lens.

PMMA (polymethylmethacrylate), which has been used as a material for plastic lenses, exhibits larger changes in refractive index due to change of temperature and moisture (i.e., humidity) and its optical efficiency changes greatly depending on environmental circumstances. Particularly, when humidity changes occur, the lens becomes out of focus. In addition, the wave surface of a light flux is disturbed. APO was developed by Mitsui Sekiyu Kogaku Kabushiki Kaisha as a low hygroscopic material. As the coefficient of water absorption of the APO is smaller by one digit compared with a conventional plastic lens and is 0.01% or less, it is hardly affected by change in humidity of the operating environment. Therefore, by using APO for any of the lenses, the efficiency of the lens system can become more stabilized.

As APO has a high heat-resisting temperature (136° C.) compared with conventional acrylic materials, coatings can be applied at a high temperature, which has heretofore been impossible.

TABLE 10

| FNO. = 1:8.0 | f = 30.61 | m = −0.112 | | |
|---|---|---|---|---|
| face No | r | d | n | ν |
| 1 | *12.195 | 4.00 | 1.55000 | 55.0 |
| 2 | 137.132 | 2.24 | | |
| 3 | −10.195 | 1.40 | 1.58547 | 29.9 |
| 4 | 16.733 | 1.30 | | |
| 5 | 59.562 | 1.96 | 1.80400 | 46.6 |
| 6 | −12.962 | 29.25 | | |
| 7 | ∞ | 0.70 | 1.51633 | 64.1 |
| 8 | ∞ | | | |

$K = 0.12265300 \times 10^{+1}$
$A_4 = 0.39585900 \times 10^{-4}$
$A_6 = 0.00000000$
$A_8 = 0.00000000$

EXAMPLE 8

Figure 17:
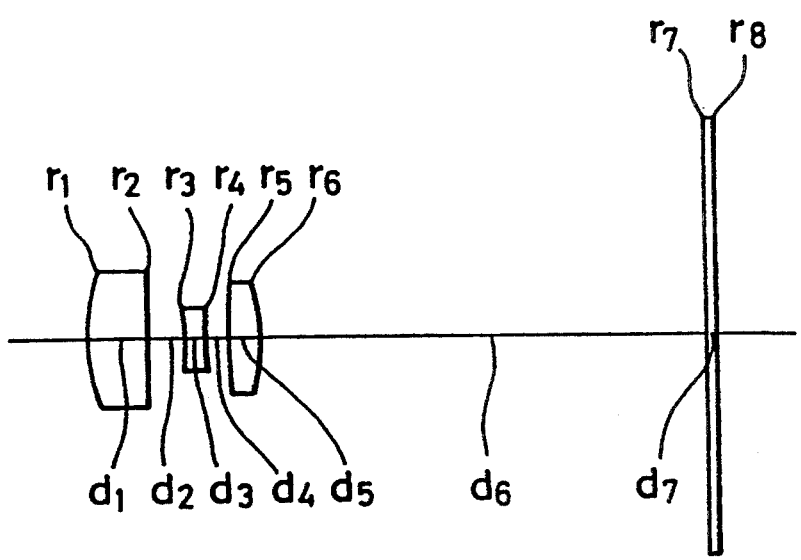
FIG. 17 is a sectional view of a lens system showing example 8 of the second embodiment according to the present invention.
Figure 18:
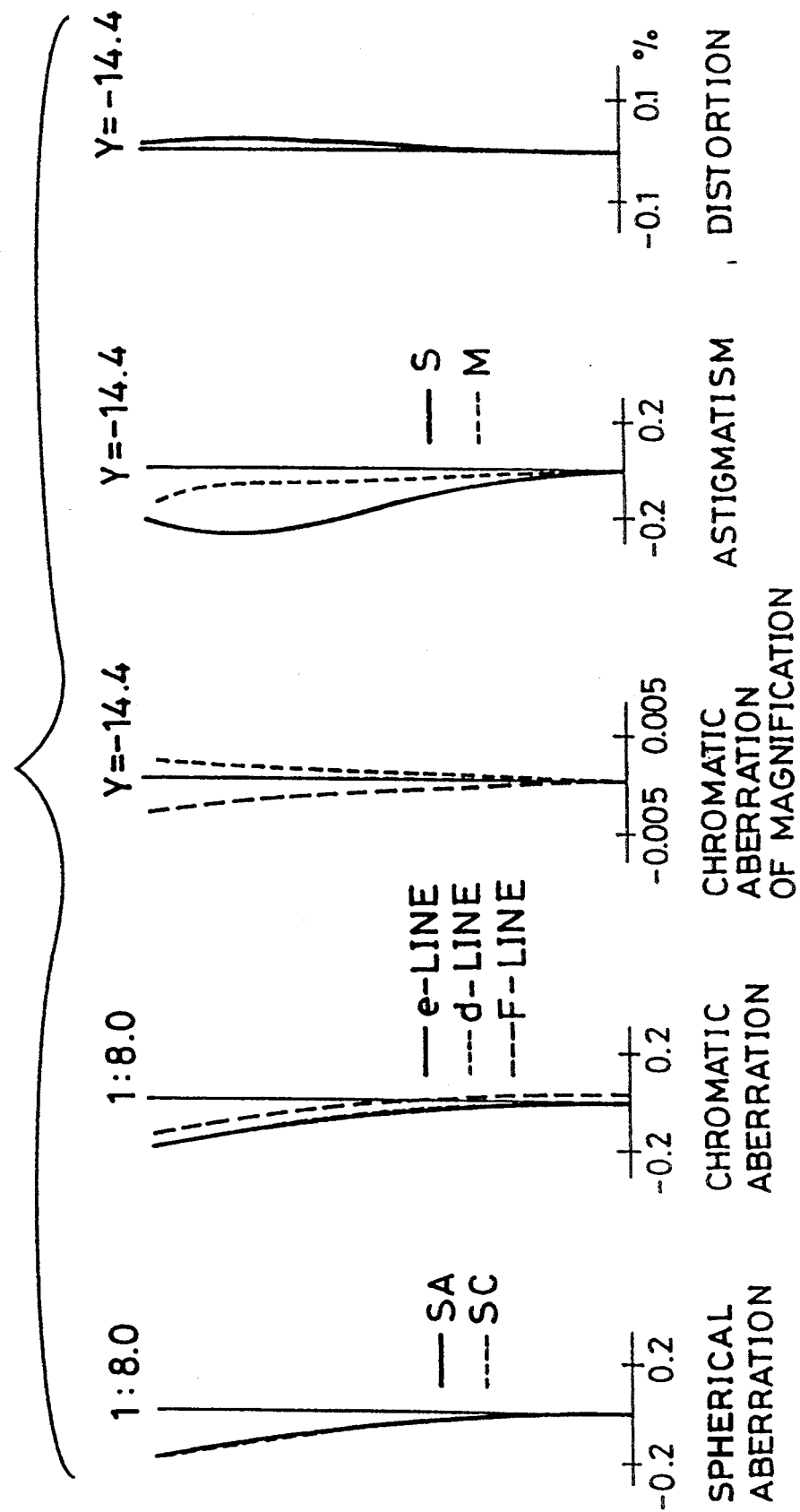
FIG. 18 are aberration diagrams of the lens system of FIG. 16.

FIGS. 17 and 18 show example 8 of the second embodiment according to the present invention, and numerical values thereof are shown in table 11.

TABLE 11

| FNO. = 1:8.0 | f = 30.65 | m = −0.112 | | |
|---|---|---|---|---|
| face No | r | d | n | ν |
| 1 | *12.291 | 4.00 | 1.55000 | 55.0 |
| 2 | 278.523 | 2.30 | | |
| 3 | −10.650 | 1.40 | 1.58547 | 29.9 |
| 4 | 16.795 | 1.55 | | |
| 5 | 69.755 | 1.98 | 1.80400 | 46.6 |
| 6 | −13.428 | 29.03 | | |
| 7 | ∞ | 0.70 | 1.51633 | 64.1 |
| 8 | ∞ | | | |

$K = 0.11187377 \times 10^{+1}$
$A_4 = 0.33285570 \times 10^{-4}$
$A_6 = 0.00000000$
$A_8 = 0.00000000$

EXAMPLE 9

Figure 19:
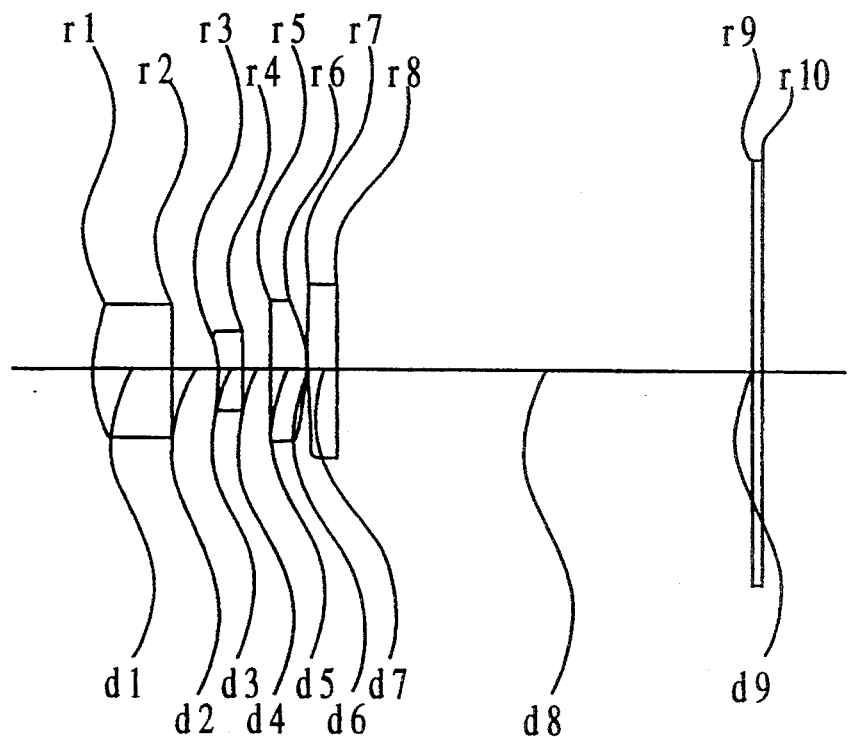
FIG. 19 is a sectional view of a lens system showing example 9 of the second embodiment according to the present invention.
Figure 20:
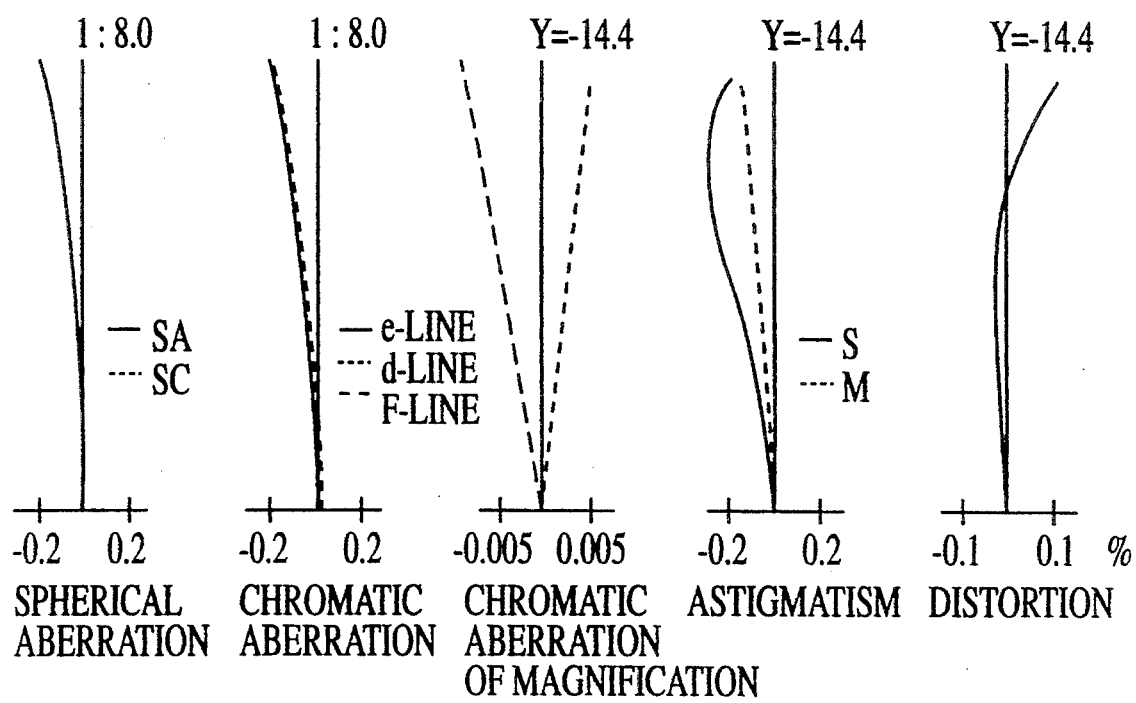
FIG. 20 represents the aberration diagrams for the lens system of FIG. 19.

FIGS. 19 and 20 show example 9 of the second embodiment according to the present invention, and numerical values for this example are shown in table 12. According to example 9, the lens system comprises a positive plastic first lens, a double concave plastic second lens, a positive glass third lens, and a double convex plastic fourth lens. The lenses are arranged in the above order, as viewed from the object side of the system. The lens system of this example includes 4 groups and 4 lens elements.

TABLE 12

| FNO. = 1:8.0 | f = 30.65 | m = −0.112 | | |
|---|---|---|---|---|
| face No | r | d | n | ν |
| 1 | *12.156 | 5.00 | 1.49176 | 57.4 |
| 2 | ∞ | 3.05 | | |
| 3 | −8.883 | 1.40 | 1.58547 | 29.9 |
| 4 | 26.676 | 2.08 | | |
| 5 | −214.354 | 2.30 | 1.80400 | 46.6 |
| 6 | −12.863 | 0.10 | | |
| 7 | 69.797 | 2.00 | 1.49176 | 57.4 |
| 8 | −167.341 | 27.26 | | |
| 9 | ∞ | 0.70 | 1.51633 | 64.1 |
| 10 | ∞ | | | |

$K = 0.81290000$
$A_4 = 0.39601600 \times 10^{-5}$
$A_6 = 0.00000000$
$A_8 = 0.00000000$ The relation between the above-mentioned respective embodiments and expression (5) are as follows.

When the diameter of the circle of least confusion: p=0.014, the F number is equal to 8.0 (F=8.0), the magnification of whole system: m=−0.112 when the right-hand side of expression (5) takes an identical value for all embodiments and the denominator is 10, it becomes $$\frac{p \cdot F \cdot (1 - m)}{10} = 0.01245,$$

and when the denominator is 20, it becomes $$\frac{p \cdot F \cdot (1 - m)}{20} = 0.00623$$

On the contrary, the values on the left-hand side are different for each embodiment and become those as shown in table 13.

TABLE 13

| EXAMPLE 1 | 0.00529 | EXAMPLE 2 | 0.00217 |
|---|---|---|---|
| EXAMPLE 3 | 0.00275 | EXAMPLE 4 | 0.00384 |
| EXAMPLE 5 | 0.00320 | EXAMPLE 6 | 0.00302 |
| EXAMPLE 7 | 0.00578 | EXAMPLE 8 | 0.00470 |

Also, the values of the respective embodiments for each of the conditions (6)–(9) are shown in table 14.

TABLE 14

| | $|f_2|/f$ | $f_3/f$ | $|r_3|/f$ | $n_5$ |
|---|---|---|---|---|
| EXAMPLE 1 | 0.370 | 0.423 | 0.321 | 1.77250 |
| EXAMPLE 2 | 0.356 | 0.445 | 0.348 | 1.80400 |
| EXAMPLE 3 | 0.344 | 0.452 | 0.335 | 1.80400 |
| EXAMPLE 4 | 0.328 | 0.419 | 0.304 | 1.80400 |
| EXAMPLE 5 | 0.338 | 0.435 | 0.317 | 1.80400 |
| EXAMPLE 6 | 0.333 | 0.428 | 0.332 | 1.83481 |
| EXAMPLE 7 | 0.344 | 0.436 | 0.333 | 1.80400 |
| EXAMPLE 8 | 0.354 | 0.459 | 0.347 | 1.80400 |

According to the above-mentioned embodiments, a reading lens comprising three groups of lenses is provided in which the effect of change of temperature is small, and which is inexpensive.

Therefore, a plastic lens can be utilized in an optical system as a facsimile and an image reader in which no focusing is performed and a large cost reduction for the lens system can be realized.

What is claimed is:

1. An imaging optical system for compensating for a change of temperature comprising:
   a lens system, in which a focal point change due to a change of temperature is defined as follows, $$\frac{d\epsilon}{dt} = \sum_{i=1}^{N} (m_{i+1} - m_i)^2 \cdot \left( \frac{dfL_i}{dt} + \frac{dfn_i}{dt} \right)$$

where;
   i: lens position from an object side
   N: number of component lenses of the whole lens system
   $m_i$: lateral magnification from i-th lens to an image side
   $m_{i+1}$: lateral magnification from i+1-th lens to the image side
   $dfn_i/dt$: fluctuation in focal length of i-th lens caused by change of refractive index
   $dfL_i/dt$: fluctuation in focal length of i-th lens caused by thermal expansion
   a light receiving element for receiving an image formed by said lens system, and
   a correcting member adapted to change a relative distance between said light receiving element and said lens system by means of linear expansion due to change of temperature, in which a thermal expansion (dL/dt) of said correcting member is set within a range as set forth hereunder;

$$0.6 \cdot \frac{d\epsilon}{dt} < (dL/dt) < 1.4 \cdot \frac{d\epsilon}{dt}.$$

2. An imaging optical system for compensating for a change of temperature according to claim 1 wherein said correcting member uses acrylic resin.

3. An imaging optical system for compensating for a change of temperature according to claim 1 wherein said lens system includes plastic lenses.

4. An imaging optical system for compensating for a change of temperature according to claim 1 wherein said lens system includes at least a lens in which a change rate (dn/dt) of refractive index with respect to change of temperature is negative.

5. An imaging optical system for compensating for a change of temperature comprising:
   a lens system including at least a lens in which a change rate (dn/dt) of refractive index n with respect to change of temperature is negative,
   a light receiving element for receiving an image formed by said lens system,
   a correcting member adapted to change a relative distance between said light receiving element and said lens system by means of thermal expansion due to change of temperature, in which a thermal expansion (dL/dt) is set within a range as set forth hereunder;

$$0.6 \cdot \left| \sum_{i=1}^{N} (K_i \cdot T_i) \right| < \frac{dL}{dt} < 1.4 \cdot \left| \sum_{i=1}^{N} (K_i \cdot T_i) \right|$$

$$K_i = (m_{i+1} - m_i)^2 \cdot f_i$$

$$T_i = \frac{1}{1 - n_i} \cdot \left( \frac{dn}{dt} \right)_i + \left( \frac{1}{L} \cdot \frac{dL}{dt} \right)_i$$

i: lens position from an object side,
   N: number of component lenses of whole imaging optical system,
   $f_i$: focal length of i-th lens,
   $m_i$: lateral magnification from i-th lens to an image side,
   $m_{i+1}$: lateral magnification from i+1-th lens, to the image side,
   $(dn/dt)_i$: rate of change of refractive index of an i-th lens, and $$\left( \frac{1}{L} \cdot \frac{dL}{dt} \right)_i:$$

thermal expansion coefficient due to change of temperature of an i-th lens.

6. An imaging optical system for compensating for a change of temperature according to claim 5 which satisfies the following expression;

$$f(1 - m) \cdot 10^{-5} < \left| \sum_{i=1}^{N} (K_i \cdot T_i) \right| < f(1 - m) \cdot 10^{-4}$$

m: lateral magnification of whole lens system, at reference temperature, and
f: focal length of whole lens system at reference temperature.

7. In an imaging optical system for compensating for a change of temperature composed of a lens system which has at least a positive lens and a negative lens, wherein a focal point change dε/dt, which is defined as follows, of said system due to change of temperature is set within a 1/10 range of depth of focus;

$$\frac{d\epsilon}{dt} = \sum_{i=1}^{N} (m_{i+1} - m_i)^2 \cdot \left( \frac{dfL_i}{dt} + \frac{dfn_i}{dt} \right)$$

where;
   i: lens position from an object side
   N: number of component lenses of the whole lens system
   $m_i$: lateral magnification from i-th lens to an image side
   $m_{i+1}$: lateral magnification from i+1-th lens to the image side
   $dfn_i/dt$: fluctuation in focal length of i-th lens caused by change of refractive index
   $dfL_i/dt$: fluctuation in focal length of i-th lens caused by thermal expansion.

8. An imaging optical system for compensating for a change of temperature according to claim 7, wherein said focal point change dε/dt is set within a 1/20 range of depth of focus.

9. An imaging optical system for compensating for a change of temperature according to claim 7, wherein said lens system Includes plastic lenses.

10. An imaging optical system for compensating for a change of temperature according to claims 9 wherein at least one of plastic lenses uses a low hygroscopic plastic.

11. An imaging optical system for compensating for a change of temperature according to claim 10, wherein said low hygroscopic plastic includes amorphous polyolefine.

12. An imaging optical system for compensating for a change of temperature according to claim 7, wherein at least one surface of said positive and negative lenses is an aspherical surface.

13. An imaging optical system for compensating for a change of temperature according to claim 7 which comprises three lens groups consisting of a first positive plastic lens, a second double concave negative plastic lens, and a third double convex positive lens arranged in that order from an object side, and satisfies the following expressions;

$$0.30 < |f_2|/f < 0.40$$

$$0.40 < f_3/f < 0.50$$

$$0.28 < |r_3|/f < 0.40$$

$$n_5 > 1.75$$

where;
f: focal length of whole system,
$f_i$: focal length of i-th lens,
$r_3$: radius of curvature of third surface, and
$n_5$: refractive index of third lens.

14. An imaging optical system for compensating for a change of temperature comprising:
a lens system, in which a focal point change $d\epsilon/dt$ due to a change of temperature is defined as follows, $$\frac{d\epsilon}{dt} = \sum_{i=1}^{N} (m_{i+1} - m_i)^2 \cdot \left( \frac{dfL_i}{dt} + \frac{dfn_i}{dt} \right)$$

where;
i: lens position from an object side
N: number of component lenses of the whole lens system
$m_i$: lateral magnification from i-th lens to an image side
$m_{i+1}$: lateral magnification from i+1-th lens to the image side
$dfn_i/dt$: fluctuation in focal length of i-th lens caused by change of refractive index
$dfL_i/dt$: fluctuation in focal length of i-th lens caused by thermal expansion
a light receiving element for receiving an image formed by said lens system
and which satisfies the following expression;

$$f(1 - m) \cdot 10^{-5} < \left| \sum_{i=1}^{N} (K_i \cdot T_i) \right| < f(1 - m) \cdot 10^{-4}$$

where;
m: lateral magnification of whole lens system, at a reference temperature,
f: focal length of whole lens system at a reference temperature,
$K_i$: dynamic factor originating in the position of the i-th lens in the lens system, and
$T_i$: focal length fluctuation of i-th lens due to a change of refractive index and thermal expansion per unit temperature change, and a correcting member adapted to change a relative distance between said light receiving element and said lens system by means of linear expansion due to change of temperature, in which a thermal expansion (dL/dt) of said correcting member is set within a range as set forth hereunder;

$$0.6 \cdot \frac{d\epsilon}{dt} < (dL/dt) < 1.4 \cdot \frac{d\epsilon}{dt}.$$

15. An imaging optical system for compensating for a change of temperature comprising:
a lens system, in which a focal point change $d\epsilon/dt$ due to a change of temperature satisfies the following expression;

$$f(1 - m) \cdot 10^{-5} < \left| \sum_{i=1}^{N} (K_i \cdot T_i) \right| < f(1 - m) \cdot 10^{-4}$$

where;
m: lateral magnification of the lens system, at a reference temperature,
f: focal length of the whole lens system at reference temperature;
$K_i$: dynamic factor originating in the position of the i-th lens in the lens system, and
$T_i$: focal length fluctuation of i-th lens due to a change of refractive index and thermal expansion per unit temperature change, and a lighting receiving element for receiving an image formed by said lens system; and
a correcting member adapted to change a relative distance between said light receiving element and said lens system by means of linear expansion due to change of temperature, in which a thermal expansion (dL/dt) of said correcting member is set within a range as set forth hereunder;

$$0.6 \cdot \frac{d\epsilon}{dt} < (dL/dt) < 1.4 \cdot \frac{d\epsilon}{dt}.$$

16. In an imaging optical system for compensating for a change of temperature composed of a lens system comprising at least three lenses which has at least a positive lens and a negative lens, wherein a focal point change $d\epsilon/dt$, which is defined as follows, of said lens system due to change of temperature is set within a 1/10 range of depth of focus;

$$\frac{d\epsilon}{dt} = \sum_{i=1}^{N} (m_{i+1} - m_i)^2 \cdot \left( \frac{dfL_i}{dt} + \frac{dfn_i}{dt} \right)$$

where;
i: lens position from an object side
N: number of component lenses of the whole lens system
$m_i$: lateral magnification from i-th lens to an image side
$m_{i+1}$: lateral magnification from i+1-th lens to the image side
$dfn_i/dt$: fluctuation in focal length of i-th lens caused by change of refractive index
$dfL_i/dt$: fluctuation in focal length of i-th lens caused by thermal expansion.

17. The imaging optical according to claim 16, wherein said lens system comprises four lenses.

18. In an imaging optical system for compensating for a change of temperature composed of a lens system which has at least a positive lens and a negative lens and comprises an asymmetric lens structure, wherein a focal point change dε/dt, which is defined as follows, of said lens system due to change of temperature is set within a 1/10 range of depth of focus;

$$\frac{d\epsilon}{dt} = \sum_{i=1}^{N} (m_{i+1} - m_i)^2 \left( \frac{df L_i}{dt} + \frac{df n_i}{dt} \right)$$

where;
  i: lens position from an object side
  N: number of component lenses of the whole lens system
  $m_i$: lateral magnification from i-th lens to an image side
  $m_{i+1}$: lateral magnification from i+1-th lens to the image side
  $\Delta fn_i$: fluctuation in focal length of i-th lens caused by change of refractive index
  $\Delta L_i$: fluctuation in focal length of i-th lens caused by thermal expansion.

19. An imaging optical system for compensating for a change of temperature, said optical system comprises three lens groups consisting of a first positive plastic lens, a second double concave negative plastic lens, and a third double convex positive lens arranged in that order from an object side, said system satisfies the following expressions:

$0.30 < |f_2|/f < 0.40$ $0.40 < f_3/f < 0.50$ $0.28 < |r_3|/f < 0.40$ $n_5 > 1.75$ where:
  f: focal length of whole system,
  $f_i$: focal length of i-th lens,
  $r_3$: radius of curvature of third surface, and
  $n_5$: refractive index of third lens.

20. An imaging optical system for compensating for a change of temperature including a positive plastic lens, having a focal length $f_i$, and a refractive index $n_i$ placed in an i-th position from an object side, and a negative plastic lens, having a focal length $f_j$ and a refractive index $n_j$, placed in a j-th position from the object side, and satisfying the expression set forth hereunder wherein the lateral magnification from the i-th lens to an image surface is $m_i$, the lateral magnification from the i+1-th lens to the image surface is $m_{i+1}$, the lateral magnification from the j-th lens to the image surface is $m_j$, the lateral magnification from the j+1-th lens to the image surface is $m_{j+1}$, the F number of the whole system is F, the lateral magnification of the whole system is m, and the picture element size of a light receiving element is p;

$$\left| \sum_{i=1}^{N} (K_i \cdot T_i) + \sum_{j=1}^{N-1} (K_j \cdot T_j) \right| < \frac{p \cdot F \cdot (1-m)}{10}$$

where;

$K_i = f_i \cdot (m_{i+1} - m_i)^2$
$K_j = f_j \cdot (m_{i+j} - m_j)^2$ $$T_i = \left( \frac{1}{L} \cdot \frac{dL}{dt} \right)_i + \frac{1}{1-n_i} \cdot \left( \frac{dn}{dt} \right)_i$$

$$T_j = \left( \frac{1}{L} \cdot \frac{dL}{dt} \right)_j + \frac{1}{1-n_j} \cdot \left( \frac{dn}{dt} \right)_j$$

$(dn/dt)_i$: rate of change of refractive index of an i-th lens, $\left( \frac{1}{L} \cdot \frac{dL}{dt} \right)_i$:

coefficient thermal expansion of an i-th lens.

21. An imaging optical system for compensating for a change of temperature according to claim 20, which satisfies p=0.014.

22. An imaging optical system for compensating for a change of temperature according to claim 20, wherein at least one surface of said positive and negative plastic lenses is an aspherical surface.

23. An imaging optical system for compensating for a change of temperature according to claim 20, wherein at least one of said positive and negative plastic lenses uses a low hygroscopic plastic.

24. An Imaging optical system for compensating for a change of temperature according to claim 23 wherein said low hygroscopic plastic includes amorphous polyolefine.

25. An imaging optical system for compensating for a change of temperature according to claim 20 which comprises three lens groups consisting of a first positive plastic lens, a second double concave negative plastic lens, and a third double convex positive lens arranged in that order from an object side, and satisfies the following expressions:

$0.30 < |f_2|/f < 0.40$ $0.40 < f_3/f < 0.50$ $0.28 < |r_3|/f < 0.40$ $n_5 > 1.75$ where;
  f: focal length of whole system,
  $f_i$: focal length of i-th lens,
  $r_3$: radius of curvature of third surface,
  $n_5$: refractive index of third lens.

26. An imaging optical system for compensating for a change of temperature according to claim 20, which comprises four lens groups including four lenses, arranged in a sequence comprising a first positive plastic lens, a second double concave plastic lens, a third positive glass lens, and a fourth double convex plastic lens extending in a direction from the object side of the optical system.

27. An imaging optical system for compensating for a change of temperature according to claim 20 which satisfies the following expression;

$$\left| \sum_{i=1}^{N} (K_i \cdot T_i) + \sum_{j=1}^{N-1} (K_j \cdot T_j) \right| < \frac{p \cdot F \cdot (1-m)}{20}.$$

28. An imaging optical system for compensating for change of temperature comprising a lens system which has at least a positive lens and a negative lens, wherein a focal point change $d\epsilon/dt$ of said lens system due to a change of temperature satisfies the following expression:

$$\frac{d\epsilon}{dt} < p \cdot F \cdot (1-m)/10$$

where $$\frac{d\epsilon}{dt} = \sum_{i=1}^{N} (m_{i+1} - m_i)^2 \cdot \left(\frac{dfL_i}{dt} + \frac{dfn_i}{dt}\right)$$

F: F number of the whole system,
m: lateral magnification of the whole system,
p: the picture element size of a light receiving element,
i: lens position from an object side
N: number of component lenses of the whole lens system
$m_i$: lateral magnification from i-th lens to an image side
$dfn_i/dt$: fluctuation in focal length of i-th caused by change of refractive index
$dfL_i/dt$: fluctuation in focal length of i-th caused by thermal expansion.

* * * * *

UNITED STATES PATENT AND TRADEMARK OFFICE
CERTIFICATE OF CORRECTION

PATENT NO. : 5,412,510
DATED : May 2, 1995
INVENTOR(S) : T. IIZUKA et al.

It is certified that error appears in the above-indentified patent and that said Letters Patent is hereby corrected as shown below:

At column 14, line 65 (claim 9, line 3), change "Includes" to ---includes---.
At column 18, line 29 (claim 24, line 1), change "Imaging" to ---imaging---.
At column 13, line 55 (claim 5, line 7), after "system," insert ---and---.
At column 14, line 68 (claim 10, line 3), after "of" insert ---said---.
At column 15, line 10 and 11 (claim 13, lines 2 and 3), change "which comprises" to ---, comprising---.
At column 16, line 67 (claim 17, line 1), after "optical" insert ---system---.
At column 17, line 21 (claim 18, line 16), change "$\Delta fn_1$:" to ---$dfn_1/dt$:---.
At column 17, line 23 (claim 18, line 18), change "$\Delta L_1$:" to ---$dfL_1/dt$:---.
At column 17, line 26 (claim 19, line 2), change "comprises" to ---comprising---.
At column 17, line 30 (claim 19, line 6), change "satisfies" to ---satisfying---.

Signed and Sealed this

Thirtieth Day of April, 1996

Attest:

BRUCE LEHMAN

Attesting Officer

Commissioner of Patents and Trademarks